(No Model.)

H. K. JONES.
WOOD SCREW.

No. 471,179. Patented Mar. 22, 1892.

Witnesses.
John Edwards Jr.
Arthur G. Beach.

Inventor.
Horace K. Jones
By James Shepard

UNITED STATES PATENT OFFICE.

HORACE K. JONES, OF HARTFORD, ASSIGNOR TO THE RUSSELL & ERWIN MANUFACTURING COMPANY, OF NEW BRITAIN, CONNECTICUT.

WOOD-SCREW.

SPECIFICATION forming part of Letters Patent No. 471,179, dated March 22, 1892.

Application filed November 23, 1891. Serial No. 412,764. (No model.)

*To all whom it may concern:*

Be it known that I, HORACE K. JONES, a citizen of the United States, residing at Hartford, in the county of Hartford and State of Connecticut, have invented certain new and useful Improvements in Wood-Screws, of which the following is a specification.

My invention relates to improvements in wood-screws, and some of the objects of my improvement are to produce a wood-screw with a large full shank of the strongest form for the amount of metal employed and of a form that will better hold the work within the rolling-dies.

Figure 1:
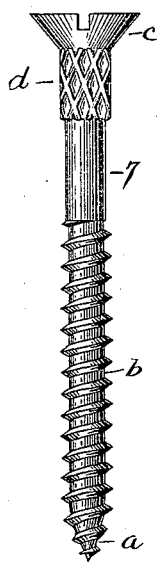
Figure 2:
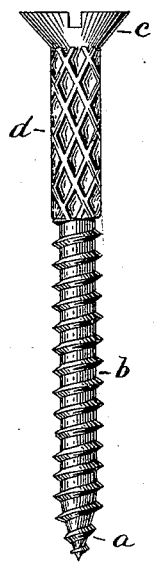
Figure 3:
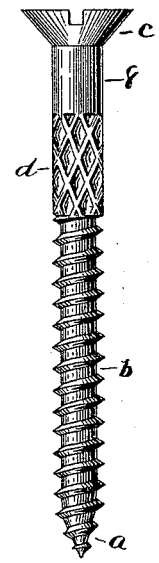
Figure 4:
Figure 5:
Figure 6:

In the accompanying drawings, Figures 1, 2, and 3 are each side elevations of my screw differing from each other in minor details; and Figs. 4, 5, and 6 are side elevations of a portion of the shank of my screw, showing different designs for the reticulated cylindrical part thereof.

The gimlet-point $a$, threaded body $b$, and the head $c$ may be of any ordinary form. The shank or part between the head $c$ and threaded body $b$ is provided with a cylindrical reamer portion $d$, consisting of a series of elevations and depressions in a reticulated form, the largest diameter of which portion is approximately equal to that of the threaded body.

In Fig. 1 the reticulated surface $d$ forms a cylindrical portion of the shank for a short distance immediately under the head. Between the reticulated surface and the threaded body is a plain portion 7 of a diameter smaller than the parts at each end thereof, but larger than the core of the threaded body, the same representing the original size of the wire, from which the threaded body and reticulated cylindrical portion of the shank have been rolled. This form is specially adapted for long screws formed with a full shank under the head and a threaded body of approximately the same size all formed by the process of "rolling" and raising up the thread and ribs or projections of the reticulated surface from one cylindrical portion of a blank.

In Fig. 2 the cylindrical portion of the shank having the raised reticulated surface extends along the entire length thereof. Said shank and threaded body may be formed in like manner by rolling from one cylindrical portion of a blank.

In Fig. 3 the reticulated surface of the shank forms a cylindrical portion at the end nearest the threaded body, and between it and the head is a plain portion 8 of approximately the same size as the portion having the reticulated surface. Such a screw may be formed by upsetting and forming the plain portion 8 in the heading-dies when the head is formed, while the portion of the shank having the reticulated surface and the screw-thread may be formed by rolling-in dies. I prefer in all cases to form the thread and the cylindrical portion having the reticulated surface by rolling; but it is evident that the same form of screw may be produced by cutting the thread while the shank is rolled.

Figs. 4, 5, and 6 represent part of the cylindrical shank having a reticulated surface formed by rolling. Fig. 4 shows intersecting straight ribs crossing each other at right angles and forming squares instead of diamond-shaped figures, as in Figs. 1, 2, and 3. Fig. 5 shows a series of intermingled elevations and depressions, making practically a reticulated surface. Fig. 6 shows the reverse of the elevations shown in Figs. 1, 2, and 3, consisting of raised diamond-shaped elevations with intersecting depressions between. These four different forms all produce the same general result, forming a series of intermingled elevations and depressions in substantially a reticulated form and producing a cylindrical portion of the shank, and the edges of said depressions and elevations extend inwardly at an abrupt angle to the general cylindrical form of the shank, so as to form cutting corners.

Other designs or forms for producing the same thing will readily suggest themselves to skilled mechanics upon seeing those herein illustrated and described.

In use the threaded body will draw the screw into the wood and the reticulated reamer portion of the shank following the same will ream out the hole left by said threaded body and form a cylindrical hole that will be filled by the shank that reamed it. In so doing the fine material detached in reaming will work along over the higher points of the reticulated surface and firmly fill the depressions therein and make the shank practically the same as a solid cylinder. In all of the forms shown the cylindrical portions having this reticulated surface are as strong as seems possible in proportion to the amount of metal employed, and they may be enlarged or raised up from a wire of a lesser diameter and of a diameter proper for rolling up the threaded body of the screw.

In rolling the gimlet-point and threaded body simultaneously with rolling the reticulated surface of the shank the depressions on that portion of the dies which roll the latter will enter the blank and form a positive lock against either rotary or endwise slipping of the blank within the rolling-dies, and thereby better hold the blank up to the work of rolling the point as well as to insure its proper rotation.

While I have shown my improvement as applied only to a gimlet-pointed wood-screw and in which its more important advantages are attained, it is evident that the same form of shank may be applied to other forms of screws, bolts, &c., where a raised surface shank is desired.

In another application filed on or about November 11, 1891, Serial No. 411,608, I have shown and described a screw having the whole or a portion of its shank formed by elevations and depressions that give the shank a reaming action and which screw may be formed by rolling-in dies. The present screw has some advantages in common with the screw of said application, which I considered unnecessary to herein set forth. I desire to make this application subordinate to said prior one.

I am aware that a prior patent shows a ratchet threaded screw or nail of my own invention in which the shank was swaged by a lateral pressure within the heading-dies into a square or triangular form in cross-section, with short transverse ribs or grooves on the broad flat faces of said square portion, and the same is hereby disclaimed. In my present invention the shank is of a form specially adapted for being rolled, instead of merely swaged or compressed laterally, and no part of the rolled shank will show a square or triangular form in cross-section, while, as before stated, the ridges have abrupt edges specially adapted for cutting or reaming.

I claim as my invention—

1. A screw or bolt having a rolled thread of a diameter somewhat larger than the normal diameter of the threaded portion and a shank having a rolled series of intersecting reticulated elevations and depressions that form a cylindrical reamer of a diameter somewhat larger than the normal diameter of said shank and approximately equal to said thread, substantially as described, and for the purpose specified.

2. A screw having a rolled thread on its body and point of a diameter somewhat larger than the diameter of the blank on which said thread is rolled and a shank having a series of intersecting reticulated elevations and depressions that form a cylindrical reamer of a diameter approximately equal to that of the threaded body, substantially as described, and for the purpose specified.

HORACE K. JONES.

Witnesses:
JAMES SHEPARD,
A. G. BEACH.